United States Patent
Kwun et al.

(10) Patent No.: US 8,050,618 B2
(45) Date of Patent: Nov. 1, 2011

(54) APPARATUS AND METHOD FOR TRANSMISSION AND RECEPTION IN MULTIPLE INPUT MULTIPLE OUTPUT SYSTEM WITH RELAY STATION

(75) Inventors: Jong-Hyung Kwun, Seongnam-si (KR);
Robert Heath, Jr., Austin, TX (US);
Taiwen Tang, Chengdu (CN);
Sung-Hyun Cho, Seoul (KR);
Chan-Byoung Chae, Austin, TX (US)

(73) Assignees: Samsung Electronics Co., Ltd., Suwon-si (KR); Board of Regents, The University of Texas System, Austin, TX (US)

( * ) Notice: Subject to any disclaimer, the term of this patent is extended or adjusted under 35 U.S.C. 154(b) by 800 days.

(21) Appl. No.: 12/156,241

(22) Filed: May 30, 2008

(65) Prior Publication Data

US 2008/0318520 A1 Dec. 25, 2008

(30) Foreign Application Priority Data

Jun. 1, 2007 (KR) .......................... 10-2007-0053902

(51) Int. Cl.
*H04B 3/36* (2006.01)
(52) U.S. Cl. .......... 455/7; 455/11.1; 455/13.1; 455/13.3; 455/16; 370/315; 370/316

(58) Field of Classification Search ............. 455/7, 11.1, 455/13.1, 561, 420, 424, 428, 456.5, 13.3, 455/16, 24, 562.1, 571, 186.1, 67.11, 37.16, 455/552; 370/341, 315, 316, 334, 318; 375/267, 375/299

See application file for complete search history.

(56) References Cited

U.S. PATENT DOCUMENTS

| | | | | |
|---|---|---|---|---|
| 6,493,331 B1 * | 12/2002 | Walton et al. | ................. | 370/341 |
| 6,744,743 B2 * | 6/2004 | Walton et al. | ................. | 370/318 |
| 6,952,454 B1 * | 10/2005 | Jalali et al. | ..................... | 375/260 |
| 7,746,829 B2 * | 6/2010 | Lechleider et al. | ........... | 370/334 |
| 2003/0123425 A1 * | 7/2003 | Walton et al. | ................. | 370/341 |
| 2008/0080632 A1 * | 4/2008 | Kim et al. | ..................... | 375/267 |
| 2008/0108310 A1 * | 5/2008 | Tong et al. | ...................... | 455/69 |
| 2009/0129502 A1 * | 5/2009 | Tong et al. | ..................... | 375/299 |

* cited by examiner

*Primary Examiner* — Tan Trinh

(57) ABSTRACT

A multiple antenna system for using a relay station with multiple antennas is provided. The system includes a base station for determining encoded data processing procedure based on first and second channel state information, determining a relaying procedure of the relay station, and sending the relaying procedure to the relay station based on the first and second channel state information; wherein the encoded data is terminating to a mobile station; the relay station for receiving data and the relay procedure which the base station sent, converting and sending the data according to the relaying procedure, and sending the first channel state information to the base station as a measured state of channel which receives the data; and the mobile station for receiving the data which the relay station sent, and sending the second channel state information to the relay station as a measured state of channel which receives the data.

18 Claims, 14 Drawing Sheets

APPARATUS AND METHOD FOR TRANSMISSION AND RECEPTION IN MULTIPLE INPUT MULTIPLE OUTPUT SYSTEM WITH RELAY STATION

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Jun. 1, 2007 and assigned Serial No. 2007-53902, the entire disclosure of which is hereby incorporated by reference.

TECHNICAL FIELD OF THE INVENTION

The present invention relates generally to an apparatus and method for transmission and reception in a Multiple Input Multiple Output (MIMO) system with a relay station and, in particular, to a framework for high performance in the MIMO system with preprocessing at the base station and linear signal processing at the relay station.

BACKGROUND OF THE INVENTION

FIG. 1 is a diagram illustrating a typical cellular communication system including a relay station.

In FIG. 1, using fixed relay stations boosts coverage in cellular networks. This is a low-cost and low-complexity solution to meet requirements of high data rate communications even in highly attenuated propagation environments such as cell-edges. This fact can be applied to all communication system using a fixed relay station.

For better performance, applying MIMO technology to base station and mobile station is under progress, and when the MIMO technology is applied to the fixed relay station, better performance can be achieved. Multi-user transmission is the most important part in the MIMO technology.

However, the current research on the fixed relay station has focused on the single user transmission and multiuser transmission using the MIMO technology is not studied enough.

SUMMARY OF THE INVENTION

To address the above-discussed deficiencies of the prior art, it is a primary object of the present invention to address at least the above problems and/or disadvantages and to provide at least the advantages described below. Accordingly, an aspect of the present invention is to provide an apparatus and method for transmission and reception in a Multiple Input Multiple Output system with a relay station.

Another aspect of the present invention is to provide an apparatus and method for transmission and reception with low complexity and high performance in a Multiple-Input, Multiple-Output system with a relay station.

According to one aspect of the present invention, a multiple antenna system using a relay station with multiple antennas is provided. The system includes a base station for determining a procedure of processing encoded data, terminating to a mobile station based on first channel state information and second channel state information, determining a relaying procedure of the relay station, and sending the relaying procedure to the relay station based on the first channel state information and the second channel state information; the relay station for receiving data and the relaying procedure which the base station sent, converting and sending the data according to the relaying procedure, and sending the first channel state information on a channel received the data to the base station; and the mobile station for receiving the data which the relay station sent, and sending the second channel state information on a channel received the data to the relay station.

According to another aspect of the present invention, a multiple antenna system for using a relay station with multiple antennas is provided. The system includes a base station for receiving a procedure of processing encoded data terminating to a mobile station, processing data according to the encoded data processing procedure, and sending to a relay station; the relay station for the data which the base station sent, obtaining first channel state information after measuring, and determining a relaying procedure and the data processing procedure for the base station based on the first channel state information and second channel state information; and the mobile station for receiving the data which the relay station sent, and sending the second channel state information to the relay station; wherein the second channel state information is a measured state of channel which receives the data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

A description of an apparatus and method for transmission and reception in a Multiple Input Multiple Output system with a relay station is made below.

The present invention proposes an apparatus and method for a novel framework of using Multiple Input Multiple Output (MIMO) fixed relay stations for multiuser transmission in MIMO cellular systems. The present invention can be used in both Time Division Duplex (TDD) mode and Frequency Division Duplex (FDD) mode.

The relay station applies linear signal processing for the relaying. Multiple antennas are used in both the base station and the relay station. A multiple antenna transmission technology is supported through a relay station.

Figure 1:
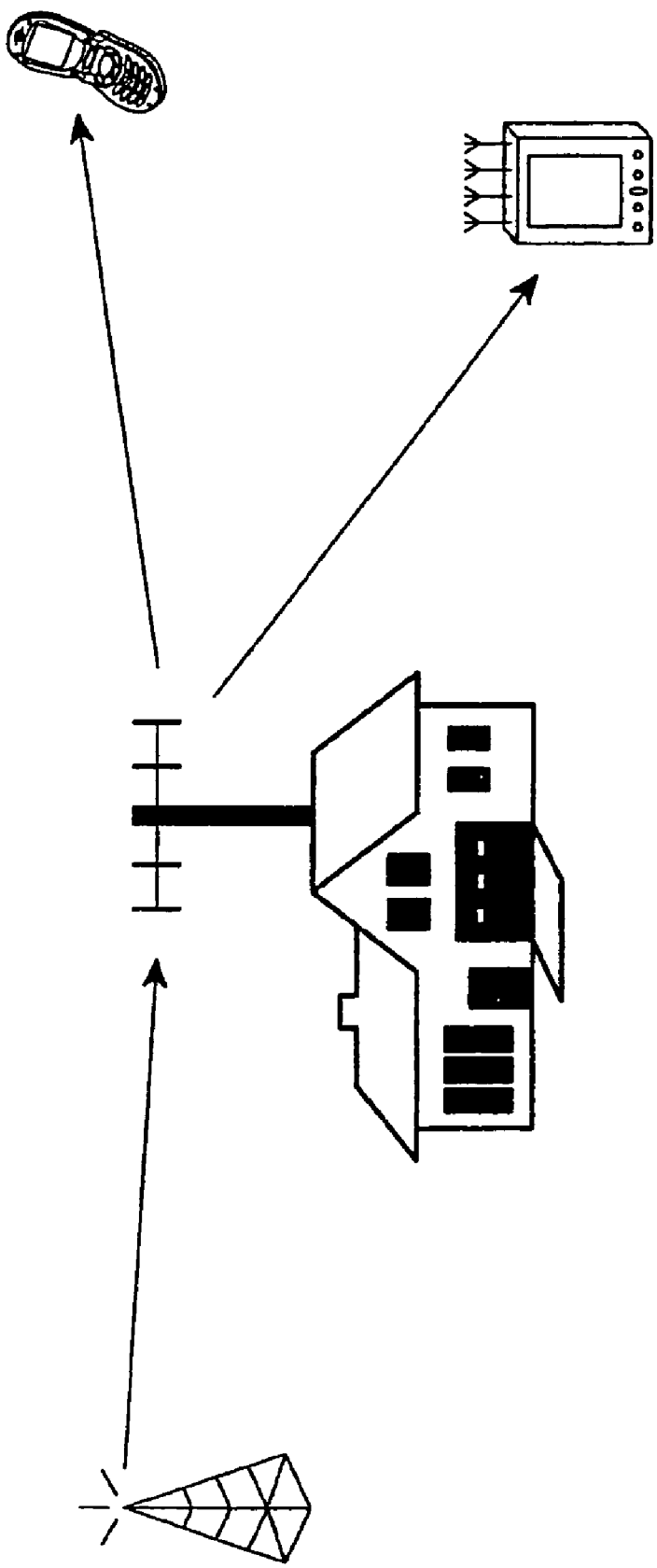
FIG. 1 is a diagram illustrating a typical cellular communication system including a relay station.
Figure 2:
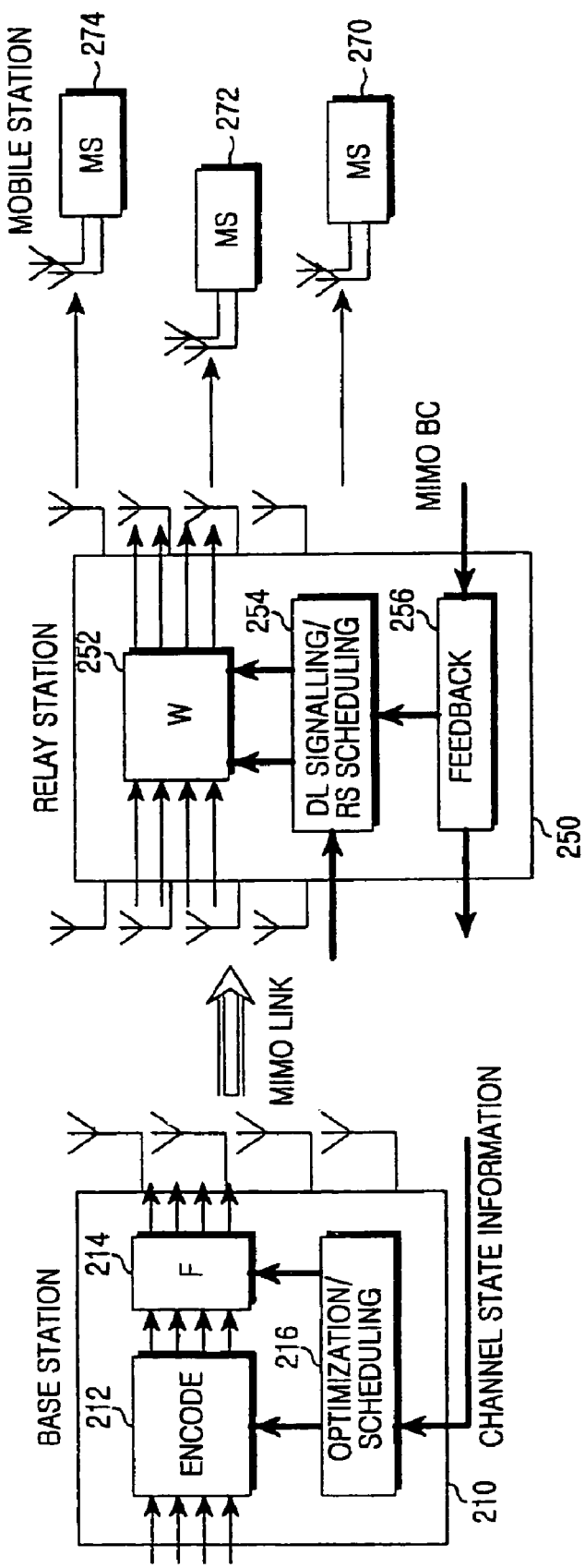
FIG. 2 is a diagram illustrating a multiuser fixed relay station with linear processing at a relay station according to an exemplary embodiment of the present invention.

FIG. 2 is a diagram illustrating a multiuser fixed relay station with linear processing at a relay station according to an exemplary embodiment of the present invention.

In FIG. 2, a Base Station (BS) 210, a Relay Station (RS) 250 and a Mobile Stations (MSs) 270, 272, 274 have multiple antennas. The RS 250 applies linear signal processing for multiuser. This design has low implementation complexity and low processing latency compared to the Decode-Forward (DF) approach which requires decoding at the relay station. The Operation of individual node will be explained below.

Figure 3:
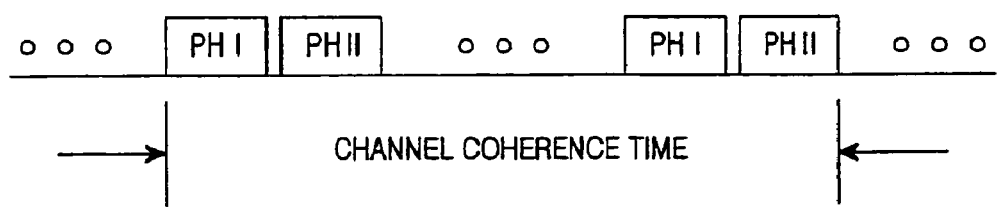
FIG. 3 is a diagram illustrating Time Division Duplex (TDD) mode for a fixed relay station according to an exemplary embodiment of the present invention.

FIG. 3 is a diagram illustrating Time Division Duplex (TDD) mode for a fixed relay station according to an exemplary embodiment of the present invention.

In FIG. 3, in TDD mode, the downlink transmission is conducted in two phases. Each phase spans an equal duration in time. In Phase I, the base station transmits data directly to the relay station and the relay station stores and processes the received signal. In Phase II, the relay station broadcasts the processed signal to multiple users.

Figure 4:
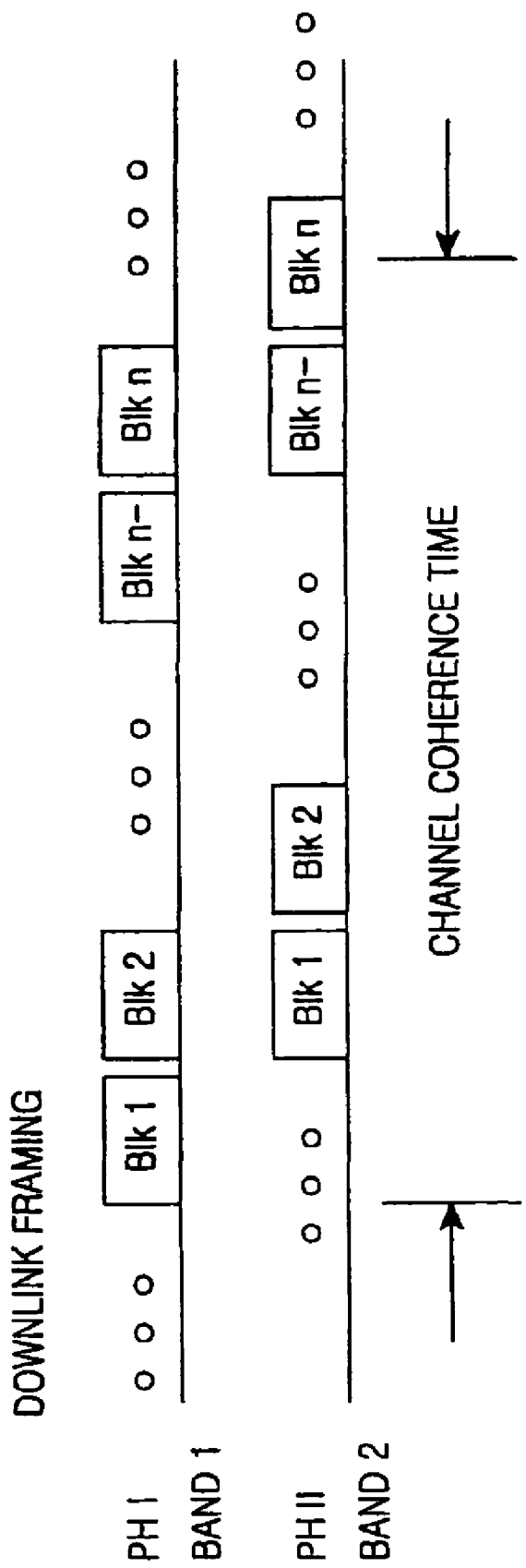
FIG. 4 is a diagram illustrating Frequency Division Duplex (FDD) mode for a relay station according to an exemplary embodiment of the present invention.

FIG. 4 is a diagram illustrating Frequency Division Duplex (FDD) mode for the relay station according to an exemplary embodiment of the present invention.

In FIG. 4, in FDD mode, two different frequency bands are used for the downlink transmissions from the base station to the relay station and from the relay station to the users. The relay station has the full duplex function. The relay station receives a signal from the base station and transmits the processed signal on different frequency bands at the same time.

Figure 5:
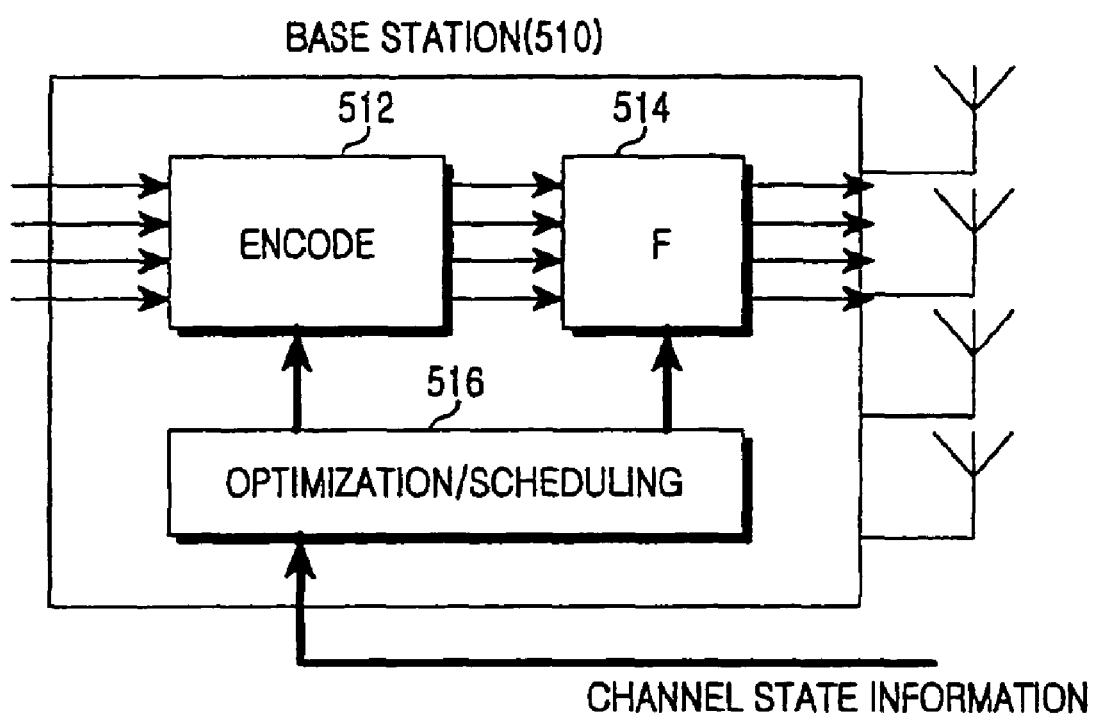
FIG. 5 is a block diagram of a base station according to an exemplary embodiment of the present invention.

FIG. 5 is a diagram illustrating a base station according to an exemplary embodiment of the present invention.

In FIG. 5, for each downlink frame, the base station 510 transmits data to multiple users. A precoder F 514 is used to process the encoded multiple data streams that are intended for multiple users.

An embodiment of the precoder F 514 is a square matrix that can perform linear transformation of the input signal streams.

The base station 510 can make centralized decisions for encoding 512, scheduling 516 and determining F 514 based on the channel state information of the MSs and the relay stations and the traffic information of different users.

Figure 6:
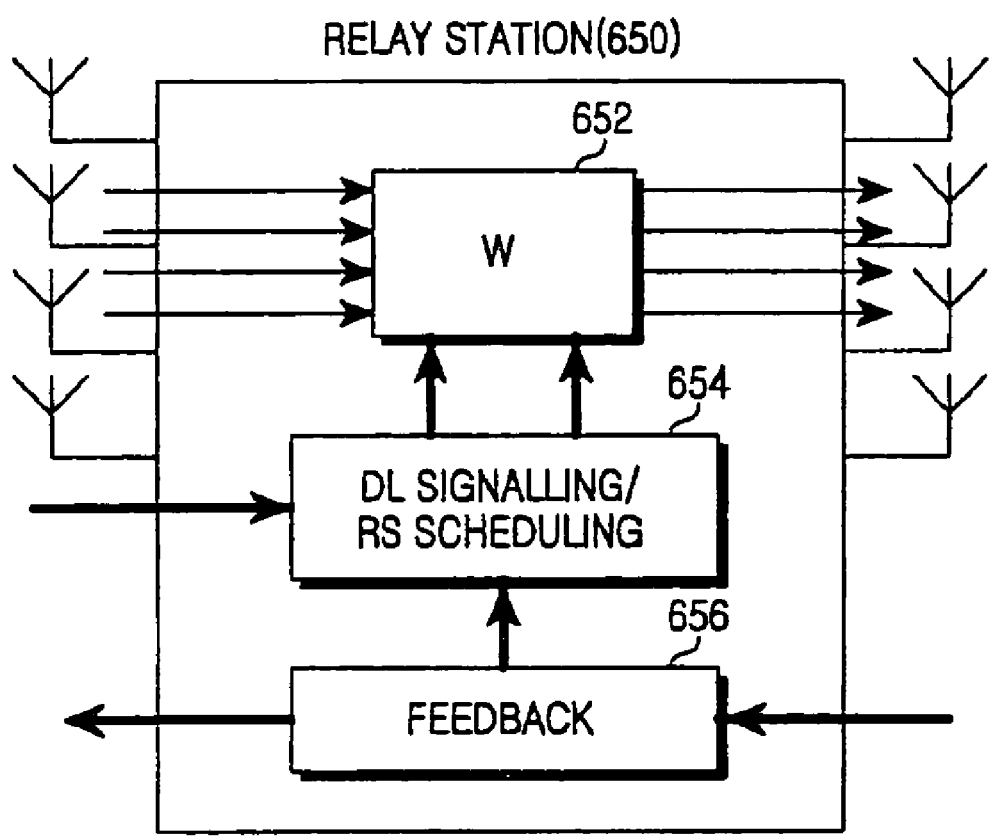
FIG. 6 is a block diagram of a relay station according to an exemplary embodiment of the present invention.

FIG. 6 is a diagram illustrating a relay station according to an exemplary embodiment of the present invention.

In FIG. 6, the relay station 650 receives the signals from the base station and processes them. The processed signal is then broadcast to multiple users. The main functionality of the relay station 650 is to enhance coverage for downlink transmission. When the direct links between the base station and the mobile stations are heavily attenuated, this facilitates reliable communications between the base station and the mobile station.

A linear processing unit W 652 performs the transformation of the received data streams. The relay station 650 needs to feed back channel state information or other information to the base station for the link between the base station and the relay station 650.

Though it is not shown in FIG. 6, feedback 656 measures the received signal from the base station and can generate channel state information. A mobile station can easily estimate the channel state information from a pilot symbol which the base station sent.

The mobile station feeds back the channel state information directly to the base station, or the mobile station quantizes the channel state information and feeds back a few bits of information to the base station in FDD mode, or the mobile station feeds back an analog signal including the channel state information to the base station in TDD mode.

With this channel state information, the base station obtains downlink channel information and makes beamforming possible by precoding. These enhance the coverage of downlink transmission.

The relay station 650 may perform scheduling based on the channel information of the link between the base station and the relay station 650 and the channel information of the link between the relay station 650 and the mobile station as well as users' traffic information that the base station informs.

As part of the scheduling functionality, the relay station 650 may optimize F and W and configure them. This requires the relay station 650 to feed back F or a representation of F to the base station.

When the precoder makes a Singular Value Decomposition (SVD), it uses a general right unitary value. However, these make too much feedback, so it is needed to quantize to a few bits which represent the precoder, then feedback to the base station with code book index. In this case, the base station can obtain code book from the code book index. The method using code book does not feed back F directly, but feeds back similar information so the code book index refers to the information which represents the precoder.

If the relay station 650 does not have any scheduling functionality, the base station performs the scheduling and the optimization for F and W.

In this case, the relay station 650 needs to feed back to the base station the channel information of the link between the relay station 650 and the mobile station and the channel information of the link between the base station and the relay station 650. The base station configures W via downlink signaling to the relay station 650. The relay station 650 performs downlink signaling and scheduling 654.

Figure 7:
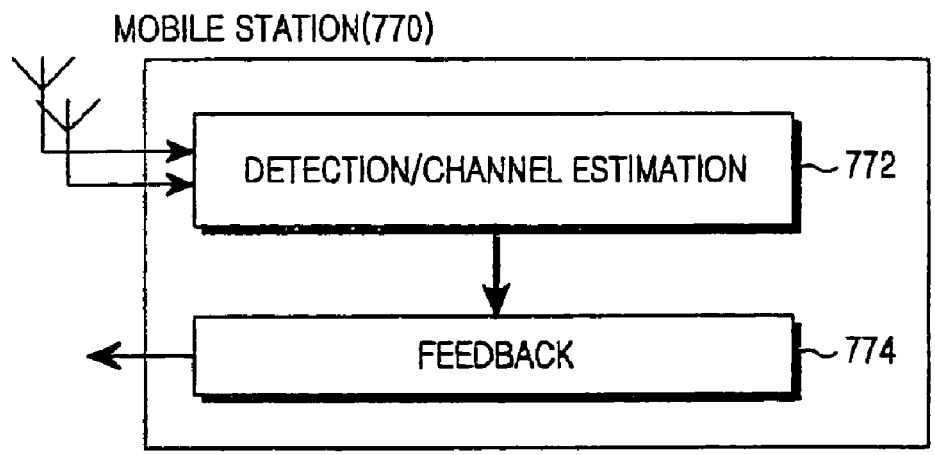
FIG. 7 is a block diagram of a mobile station according to an exemplary embodiment of the present invention.

FIG. 7 is a diagram illustrating a mobile station according to an exemplary embodiment of the present invention.

In FIG. 7, the mobile station 770 receives signals broadcast from the relay station through a receive block 772 if the relaying is required. The mobile station 770 receives the signals directly from the base station if the relaying is not required.

The mobile station 770 performs channel estimation, decodes the received signal and also feeds back 774 the channel information using uplink channels.

The base station and the relay station optimize the precoder F and the linear processing unit W.

Figure 8:
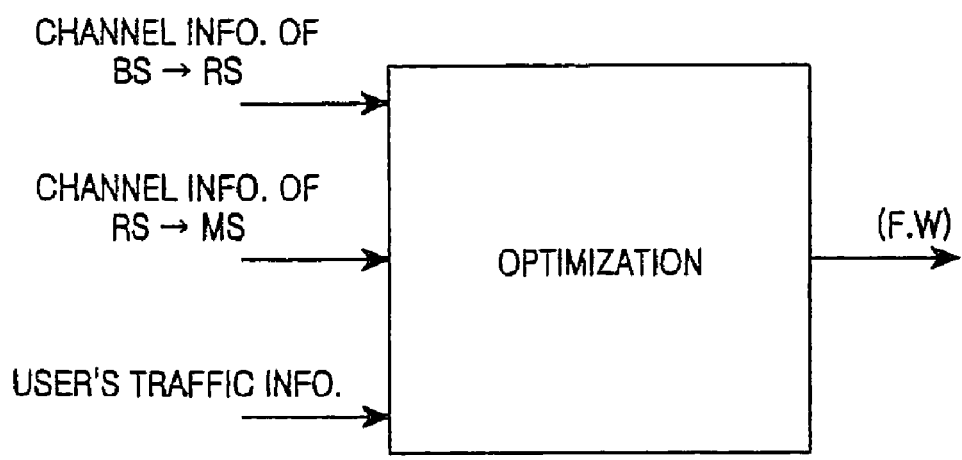
FIG. 8 is a diagram illustrating an optimization block according to an exemplary embodiment of the present invention.

FIG. 8 is a diagram illustrating an optimization block according to an exemplary embodiment of the present invention.

In FIG. 8, several forms of MIMO relaying matrix W are proposed in the following description.

Some algorithms that aim to maximize an achievable sum throughput are proposed.

Some design algorithms that have lower complexity by imposing certain structures on F and W are proposed for optimization of the precoding matrix at the base station and the linear processing matrix at the relay station.

A first algorithm relates to all-pass relay design. The relay station processing unit W is to be as Equation (1) below:

$$W = g_w \begin{bmatrix} 1 & & \\ & 1 & \\ & & 1 \end{bmatrix}, \quad \text{[Eqn. 1]}$$

where $g_w$ is a gain factor. With this structure, the present invention jointly optimizes the power loading at the base station and the gain factor at the relay station to maximize an achievable throughput of the system.

The cost function is derived based on a lower bound of the sum capacity using dirty-paper coding.

The optimization problem has the structure of geometric programming and it can be transformed into a convex optimization and solved using efficient iterative algorithms such as interior methods.

A second algorithm relates to a diagonal relay design.

The present invention imposes a structure of the linear processing unit as Equation (2) below:

$$W = U \begin{bmatrix} k_1 & & \\ & k_1 & \\ & & k_1 \end{bmatrix} V, \quad \text{[Eqn. 2]}$$

where $k_i$ are the design parameters which determine power loading at the relay station. The matrices U and V are unitary matrices that are used to equalize the wireless channels between the relay station and users and between the base station and the relay station respectively.

The present invention formulated an optimization problem to jointly adjust the power loading at the base station and the power loading at the relay station to maximize an achievable sum throughput.

This optimization problem has the structure of geometric programming and it can be transformed into a convex optimization and solved using efficient algorithms such as interior methods.

A third algorithm relates to equal power transmission with relay waterfilling.

The third algorithm that the present invention proposes is restricted to use equal power transmission for all transmitted data streams at the base station and relies on adjusting the power loading at the relay station to maximize an achievable throughput of the system.

The structure of this problem is similar to the diagonal relay design. The advantage of this design is that the optimization problem is convex and can be solved directly using interior methods.

A fourth algorithm relates to reduced complexity user selection.

In each frame, multiple users are selected for data transmission in this system. The user selection and ordering is part of the functionality of scheduling and are important for the overall system performance.

The present invention proposes a new metric to pre-determine users' channel quality. This metric considers the channel quality of both links and serves as an indicator of the overall system performance.

With this metric, the present invention modifies an existing user selection algorithm for the broadcast channel to select and order a group of users with good channel quality from all users. The proposed algorithm is proven to have low operation complexity and achieve multiuser diversity gain.

Figure 9:
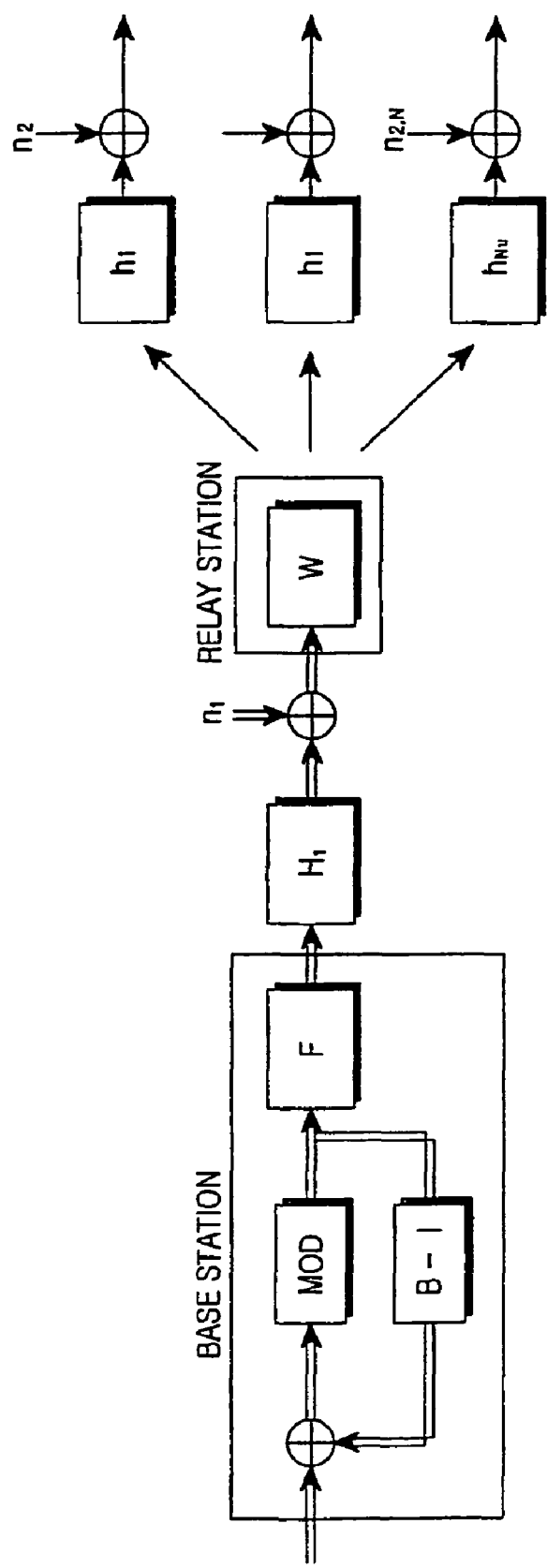
FIG. 9 is a diagram illustrating of a Tomlinson-Harashima precoder according to an exemplary embodiment of the present invention.

FIG. 9 is a diagram illustrating a Tomlinson-Harashima precoder according to an exemplary embodiment of the present invention.

In FIG. 9, the present invention provides an implementation of the fixed relay station with a Tomlinson-Harashima precoder. Multiple users with good channels are selected from all users based on the user selection algorithm as elaborated earlier.

In the proposed system, a Tomlinson-Harashima Precoder (THP) is deployed at the base station, whereas the relay station only uses simple linear processing. This architecture efficiently utilizes the signal processing facility at the base station and only demands simple processing at the relay station.

Further, the THP at the base station can be shared by the users within direct coverage of the base station for multiuser transmission.

Each user has a requirement on instantaneous SINR in order to meet its target symbol error rate (SER) constraint. Since the channels are time-varying, different QAM modulation and power allocation need to be used for different channels.

The present invention proposes a procedure to jointly optimize the power allocation and QAM modulation to maximize the sum spectral efficiency under the target SER constraints of different users. This procedure adapts modulation schemes and the number of data streams with varying channel conditions.

The present invention elaborates on two embodiments of the system operation procedures in the following system description.

In the first embodiment, the base station makes the scheduling decision and optimizes F and W.

At the first step, the base station acquires channel information.

Figure 10:
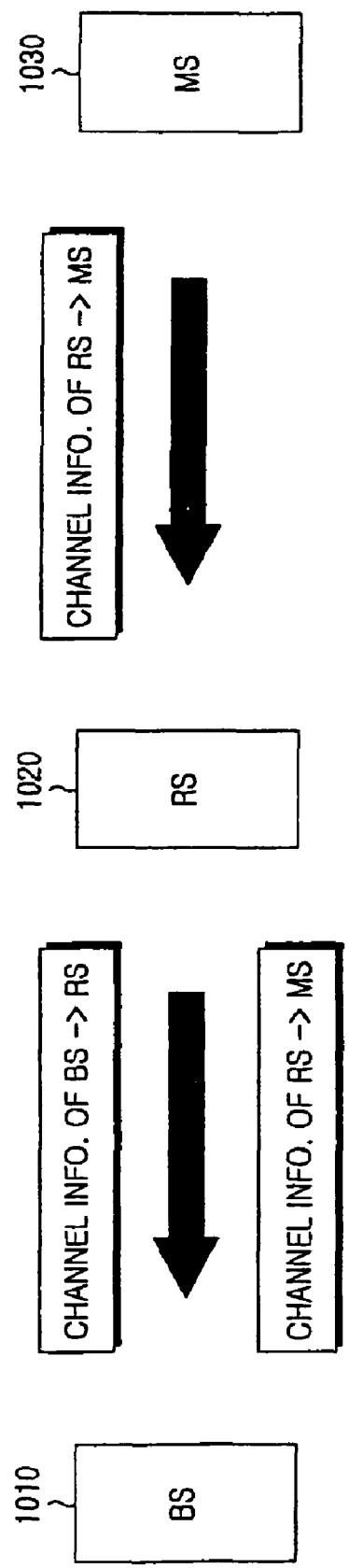
FIG. 10 is a diagram illustrating a procedure of acquiring channel information according to an exemplary embodiment of the present invention.

FIG. 10 is a diagram illustrating a procedure of acquiring channel information according to an exemplary embodiment of the present invention.

In FIG. 10, channel information is measured by the relay station 1020 and mobile station 1030 then fed back to the base station 1010. In particular, channel information between the relay station 1020 and the mobile station 1030 is measured and fed back to the base station 1010 via relaying.

At the second step, the base station 1010 makes the centralized decision and optimizes F and W based on feedback information.

At the third step, the base station 1010 makes downlink signaling to configure the relay station 1020.

Figure 11:
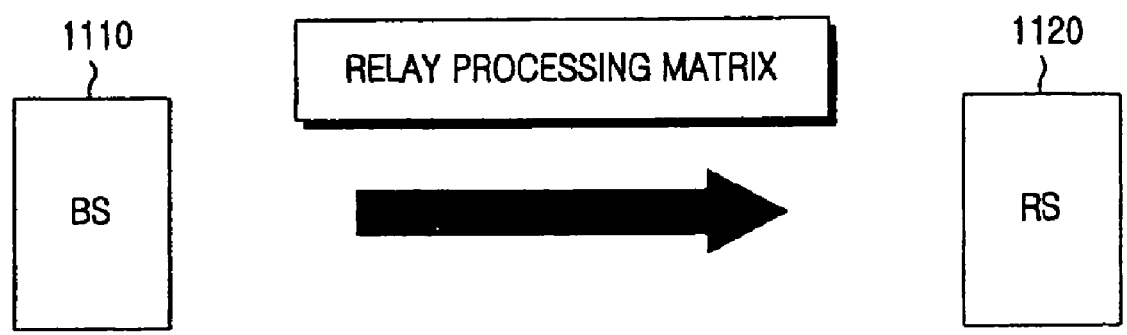
FIG. 11 is a diagram illustrating a procedure of base stations configuring the relay station via downlink signaling according to an exemplary embodiment of the present invention.

FIG. 11 is a diagram illustrating a procedure of base stations configuring the relay via downlink signaling according to an exemplary embodiment of the present invention.

In FIG. 11, the base station 1110 configures the relay station 1120 using downlink signaling mechanism. This involves an update of the relaying matrix W.

In the second embodiment, the relay station performs the optimization.

At the first step, a channel information procedure is performed.

Figure 12:
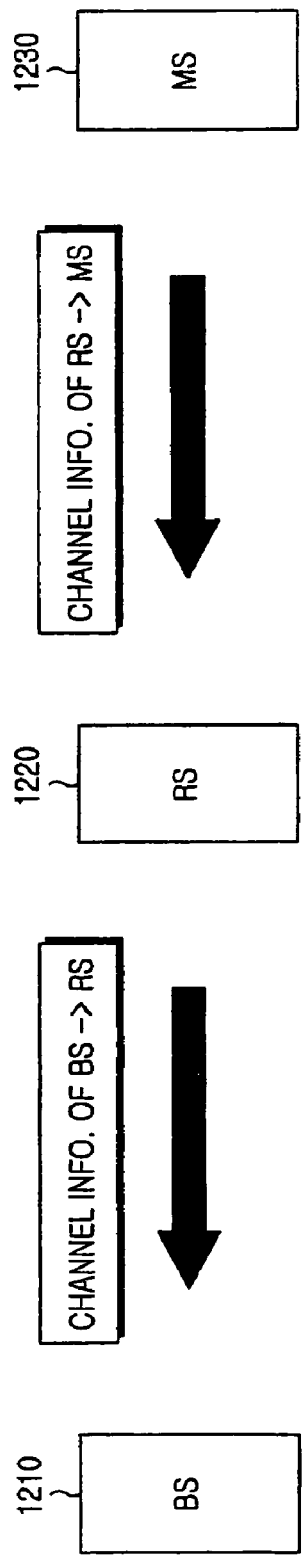
FIG. 12 is a diagram illustrating a procedure of acquiring channel information according to another exemplary embodiment of the present invention.

FIG. 12 is a diagram illustrating a procedure of acquiring channel information according to another exemplary embodiment of the present invention.

In FIG. 12, the relay station 1220 can measure the channel between the base station 1210 and the relay station 1220. The channel information between the relay station 1220 and the mobile station 1230 is fed back from the mobile station 1230 to the relay station 1220.

At the second step, the relay station 1220 optimizes F and W.

The optimization can be done based on the channel information between the base station 1210 and the relay station 1220 and the channel information between the relay station 1220 and the mobile station 1230.

It may also require the base station 1210 to send users' traffic information to the relay station 1220.

At the third step, the relay station 1220 feeds back F or a representation of F and other parameters to the base station 1210.

F is obtained to enhance the quality of signal to the mobile station and needs channel of the mobile station. To compute F at the base station, the relay station needs to know the channel between the relay station and the mobile station.

To compute F at the base station makes the amount of feedback to be too much and too complex. Therefore, the relay station computes F, and then feeds back to the base station after quantization to a few bits. The relay station easily estimates the channel between the base station and the relay station through downlink pilot signals and easily obtains the channel between the relay station and the mobile station from feedback at the mobile station. These reduce feedback overhead compared to individual computation at each the relay station and the base station and obtain F and W simultaneously.

Figure 13:
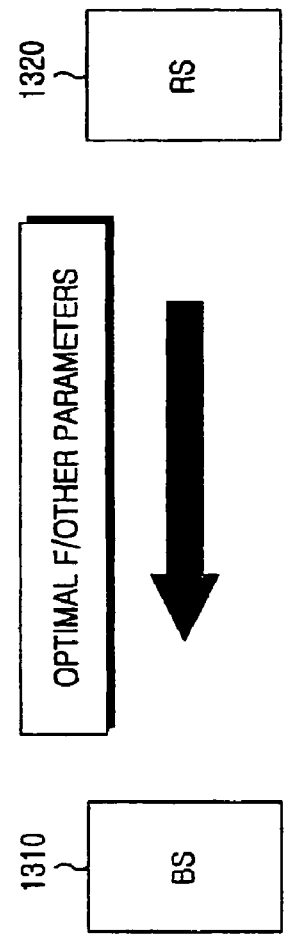
FIG. 13 is a diagram illustrating a procedure of feedback according to another exemplary embodiment of the present invention.

FIG. 13 is a diagram illustrating a procedure of feedback according to another exemplary embodiment of the present invention.

In FIG. 13, the relay station 1320 obtains an optimal F and informs this to the base station 1310.

In this system, feedback of channel information can be performed using the following methods.

Figure 14:
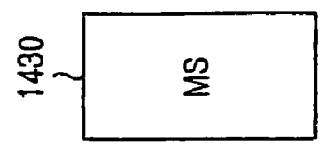
FIG. 14 is a diagram illustrating of feedback/control channels according to an exemplary embodiment of the present invention.
Figure 14:
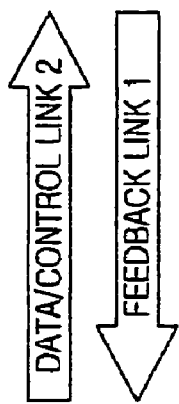
Figure 14:
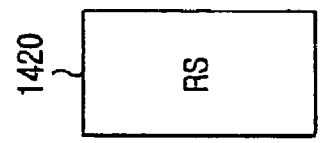
Figure 14:
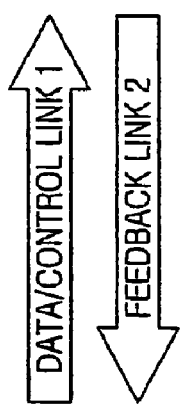
Figure 14:
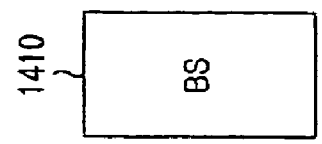

FIG. 14 is a diagram illustrating of feedback/control channels according to an exemplary embodiment of the present invention.

In FIG. 14, a first method uses a limited feedback scheme. This requires the mobile station 1430 or the relay station 1420 to quantize the measured channels and packages the quantized information into feedback messages.

A second method uses uplink channel sounding scheme to directly transmit DL channel coefficients to the base station 1410 or the relay station 1420 along with an uplink (UL) sounding waveform.

The descriptions of the corresponding feedback methods for the proposed two operation flows are made below.

At the first method, the base station performs the optimization.

This requires feedback of the channel information or a quantized version of the channel information or other representation of the channel information of the link RS→MS from the mobile station to the base station via the relay station's relaying.

This also requires feedback of the channel information or a quantized version of the channel information or other representation of the channel information of the link BS→RS from the relay station to the base station.

Alternatively, these feedbacks can be achieved using uplink channel sounding.

At the second method, the relay station performs the optimization.

This requires feedback of the channel information or a quantized version of the channel information or other representation of the channel information of the link RS→MS from the mobile station to the relay station.

This also requires feedback of the channel information or a quantized version of the channel information or other representation of the channel information of the link BS→RS to BS from the relay station to the base station.

This also requires feedback of the optimum F or a quantized version of F or other representation of F from the relay station to the base station, which is computed from the relay design optimizations. Alternatively, these feedbacks can be achieved using uplink channel sounding mechanism.

Figure 15:
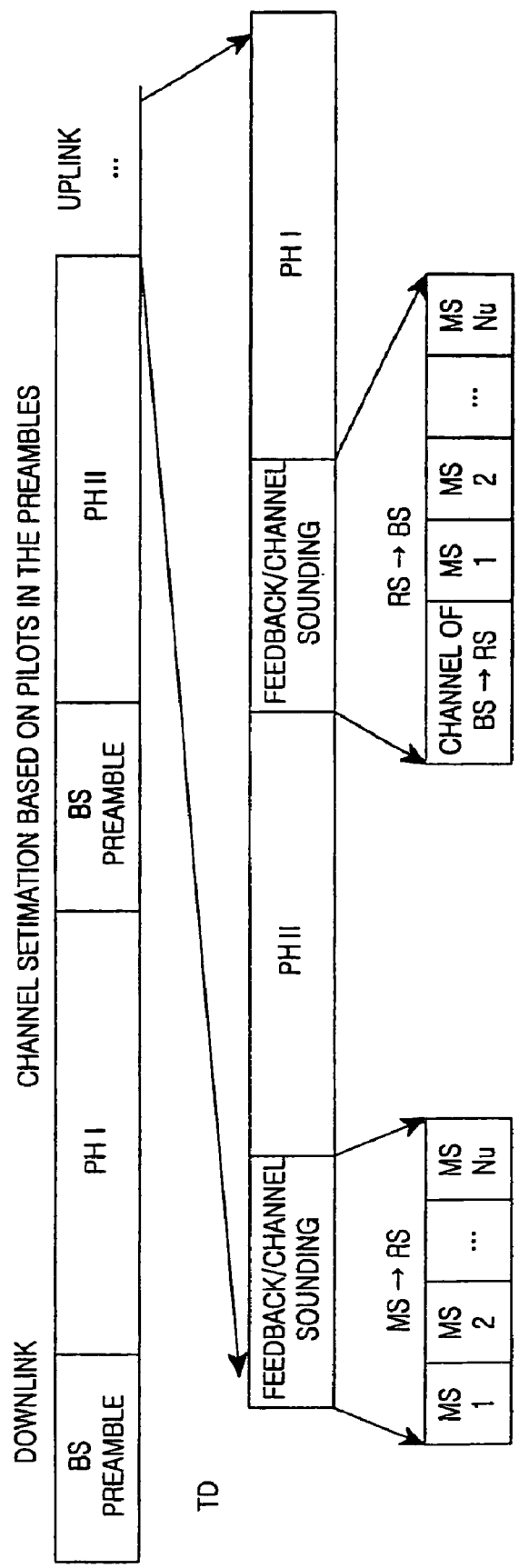
FIG. 15 is a diagram illustrating a frame structure for the system that incorporates uplink feedback according to an exemplary embodiment of the present invention.

FIG. 15 is a diagram illustrating a framing structure for the system that incorporates uplink feedback according to an exemplary embodiment of the present invention.

In FIG. 15, the present invention illustrates one embodiment of the system framing that incorporates uplink feedback for the case that the base station performs the optimization. Dedicated feedback time slots are assigned for the relay station and the mobile station to carry their feedback information.

The present invention now shows comparison of complexity of the proposed system with a concatenated system and compares the complexity of the relay station and the feedback requirements of the proposed system with a concatenated system.

Figure 16:
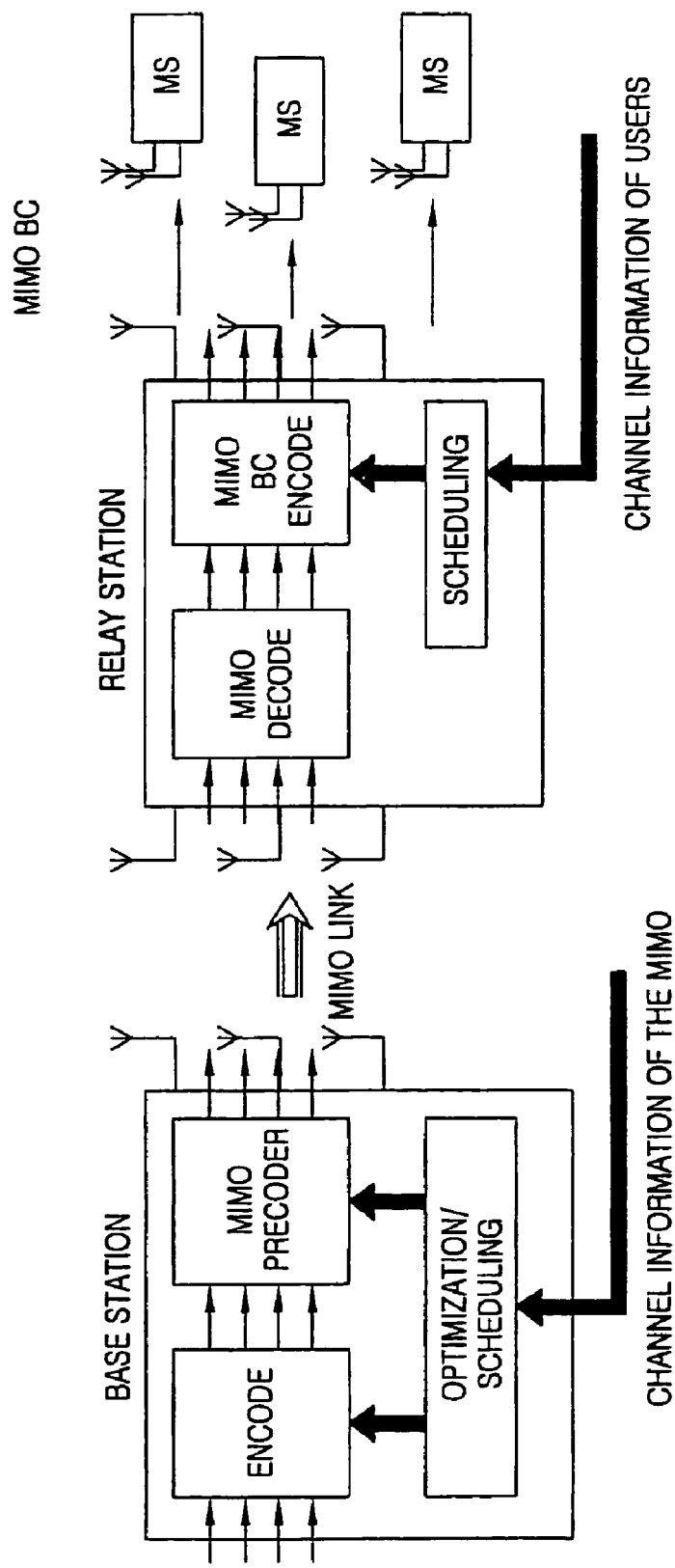
FIG. 16 is a diagram illustrating a conventional system for comparison with a system of the present invention.

FIG. 16 is a diagram illustrating a conventional system for comparison with a system of the present invention.

In FIG. 16, this system has structure the MIMO link and the MIMO broadcast link are connected. This system uses the decode-and-forward strategy at the relay station. The base station performs MIMO encoding based on the channel information between the link of BS→RS, which is fed back from the relay station to the base station.

The relay station decodes the signal from the base station and performs scheduling for the mobile stations that are within the coverage of the relay station based on the feedback of the mobile station channel information.

The relay station encodes the data for the selected mobile station and broadcasts it using MIMO broadcast channel coding (e.g., dirty paper coding).

It is assumed that a simple linear receiver, e.g., MMSE/Zero-forcing receiver, is used at the relay station. The complexity of relay station is compared in the following Table 1.

TABLE 1

Complexity Comparison of the RS

| RS Operation Items | Proposed System | Concatenated System |
|---|---|---|
| Matrix Multiplication | Yes | Yes |
| Matrix Inversion (MMSE/ZF) | No | Yes |
| Error decoding (e.g., Turbo decoding) | No | Yes (high complexity) |
| Multiuser BC encoding (e.g., Dirty paper coding) | No (BS takes this functionality) | Yes (high complexity) |
| Scheduling (user selection and adaptive modulation) | Maybe (May use additional scheduling at the BS) | Yes (MAC function) (high complexity) |

From Table 1, it can be found that the complexity of the relay station is significantly lower for the proposed system compared to the concatenated system.

The present invention compares the feedback requirements for the proposed system and the concatenated system in Table 2.

TABLE 2

Comparison of Feedback Requirements

| Feedback Link | Proposed System | Concatenated System |
|---|---|---|
| Feedback Link 1 | Channel info. or RS → MS | Channel info. of RS → MS |
| Feedback Link 2 (BS performs optimization) | Channel info. of BS → RS Channel info. of RS → MS | Channel info. of BS → RS |
| Feedback Link 2 (RS performs optimization) | Channel info. of BS → RS Optimum F or representation of F | Channel info. of BS → RS |
| Data/Control Link 1 (BS performs optimization) | DL signalling to configure RS | may need auxiliary traffic information from the BS for scheduling |
| Data/Control Link 1 (RS performs optimization) | may need auxiliary traffic information for the RS from the BS for scheduling | may need auxiliary traffic information for the RS from the BS for scheduling |

For the case that the relay station performs the optimization, the proposed system has similar feedback requirements as the concatenated system.

For the case that the base station performs the optimization, the proposed system has higher feedback requirements than the concatenated system because it requires feedback of channel information between the relay station and the mobile station from the relay station to the base station.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multiple antenna system for using a relay station with multiple antennas, the system comprising:

a base station for determining an encoded data processing procedure based on first channel state information and second channel state information, determining a relaying procedure of the relay station, and sending the relaying procedure to the relay station based on the first channel state information and the second channel state information, wherein the encoded data terminates to a mobile station;

the relay station for receiving data and the relay procedure which the base station sent, converting and sending the data according to the relaying procedure, and sending the first channel state information to the base station, wherein the first channel state information is a measured state of channel which receives the data; and the mobile station for receiving the data which the relay station sent, and sending the second channel state information to the relay station, wherein the second channel state information is a measured state of channel which receives the data.

2. The system of claim 1, wherein the relay station receives the second channel state information from the mobile station and sends the second channel state information to the base station.

3. The system of claim 1, wherein the base station determines a matrix for the relaying procedure to maximize the throughput using the equation:

$$W = g_w \begin{bmatrix} 1 & & \\ & 1 & \\ & & 1 \end{bmatrix},$$

where $g_w$ is a gain factor.

4. The system of claim 1, wherein the base station determines a matrix (W) for the relaying procedure to maximize throughput using the equation:

$$W = U \begin{bmatrix} k_1 & & \\ & k_1 & \\ & & k_1 \end{bmatrix} V,$$

where $k_i$ are the design parameters which determine the power loading at the relay station, and the matrices U and V are unitary matrices that are used to equalize the wireless channels between the relay station and users and between the base station and the relay station respectively.

5. The system of claim 1, wherein the base station sends all data with same power, and determines the relaying procedure to make the relay station adjust power so as to maximize throughput.

6. The system of claim 1, wherein the base station groups users with good channel state and, processes the encoded data for scheduling so as to maximize throughput.

7. The system of claim 1, wherein the relay station relays using an Amplify and Forward (AF) scheme.

8. The system of claim 1, wherein the relay station and the mobile station send quantized channel state information respectively.

9. The system of claim 1, wherein the relay station and the mobile station send channel state information using a sounding waveform respectively.

10. A multiple antenna system for using a relay station with multiple antennas, the system comprising:
- a base station for receiving encoded data processing procedure, processing data according to the encoded data processing procedure, and sending to a relay station; wherein the encoded data is terminating to a mobile station;
- the relay station for the data which the base station sent, obtaining first channel state information after measuring, and determining a relaying procedure and the data processing procedure for the base station based on the first channel state information and second channel state information; and
- the mobile station for receiving the data which the relay station sent, and sending the second channel state information to the relay station; wherein the second channel state information is a measured state of channel which receives the data.

11. The system of claim 10, wherein the relay station receives the second channel state information from the mobile station and sends the second channel state information to the base station.

12. The system of claim 10, wherein the relay station determines a matrix for the relaying procedure to maximize the throughput using the equation:

$$W = g_w \begin{bmatrix} 1 & & \\ & 1 & \\ & & 1 \end{bmatrix},$$

where $g_w$ is a gain factor.

13. The system of claim 10, wherein the relay station determines a matrix (W) for the relaying procedure to maximize throughput using the equation:

$$W = U \begin{bmatrix} k_1 & & \\ & k_1 & \\ & & k_1 \end{bmatrix} V,$$

where $k_i$ are design parameters which determine the power loading at the relay station, and the matrices U and V are unitary matrices that are used to equalize the wireless channels between the relay station and users and between the base station and the relay respectively.

14. The system of claim 10, wherein the relay station sends all data with same power, and determines the relaying procedure to make the relay station adjust power so as to maximize throughput.

15. The system of claim 10, wherein the relay station groups users with good channel state and, processes the encoded data for scheduling so as to maximize throughput.

16. The system of claim 10, wherein the relay station relays using an Amplify and Forward (AF) scheme.

17. The system of claim 10, wherein the relay station and the mobile station send quantized channel state information respectively.

18. The system of claim 10, wherein the relay station and the mobile station send channel state information using a sounding waveform respectively.

* * * * *